(12) United States Patent
Lambert et al.

(10) Patent No.: US 7,849,454 B2
(45) Date of Patent: Dec. 7, 2010

(54) AUTOMATIC FIRMWARE CORRUPTION RECOVERY AND UPDATE

(75) Inventors: Timothy Lambert, Austin, TX (US); Stephen Cochran, Cedar Park, TX (US); Pedro Lopez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1051 days.

(21) Appl. No.: 11/331,509

(22) Filed: Jan. 13, 2006

(65) Prior Publication Data
US 2007/0169088 A1 Jul. 19, 2007

(51) Int. Cl.
G06F 9/44 (2006.01)
G06F 9/45 (2006.01)

(52) U.S. Cl. .................. 717/168; 717/170; 709/203

(58) Field of Classification Search ......... 717/168–175; 709/203–204
See application file for complete search history.

(56) References Cited

U.S. PATENT DOCUMENTS

| | | | | |
|---|---|---|---|---|
| 5,568,612 A * | 10/1996 | Barrett et al. | ............... | 709/203 |
| 6,591,352 B2 | 7/2003 | Lambino et al. | ............ | 711/166 |
| 6,687,735 B1 * | 2/2004 | Logston et al. | ............. | 709/203 |
| 6,823,362 B2 * | 11/2004 | Eshghi | ........................ | 709/203 |
| 6,930,785 B1 | 8/2005 | Weyand et al. | ................ | 358/1.1 |
| 6,934,873 B2 * | 8/2005 | Lu et al. | ......................... | 714/2 |
| 6,944,854 B2 * | 9/2005 | Kehne et al. | ................ | 717/168 |
| 7,145,682 B2 * | 12/2006 | Boldon | ....................... | 358/1.15 |
| 7,146,609 B2 * | 12/2006 | Thurston et al. | ............ | 717/169 |
| 7,222,339 B2 * | 5/2007 | Rothman et al. | ............ | 717/168 |
| 7,275,152 B2 * | 9/2007 | Goud et al. | ..................... | 713/2 |
| 7,284,236 B2 * | 10/2007 | Zhou et al. | ................... | 717/121 |
| 7,299,354 B2 * | 11/2007 | Khanna et al. | .............. | 713/165 |
| 7,299,495 B2 * | 11/2007 | King et al. | ..................... | 726/22 |
| 7,305,549 B2 * | 12/2007 | Hunt et al. | ................... | 713/155 |
| 7,313,791 B1 * | 12/2007 | Chen et al. | ................... | 717/170 |
| 7,401,332 B2 * | 7/2008 | Foster et al. | ................ | 717/175 |
| 7,421,688 B1 * | 9/2008 | Righi et al. | ................. | 717/172 |
| 7,457,945 B2 | 11/2008 | Dailey et al. | ................... | 713/2 |
| 7,480,907 B1 * | 1/2009 | Marolia et al. | .............. | 717/174 |
| 7,555,750 B1 * | 6/2009 | Lilley | ......................... | 717/168 |
| 7,558,867 B2 * | 7/2009 | Le et al. | ..................... | 709/230 |
| 7,657,886 B1 * | 2/2010 | Chen et al. | ................... | 717/170 |

OTHER PUBLICATIONS

Dvorak, "Implementation of combinational and sequential funcations in embedded firmware", IEEE, pp. 80-85, 2007.*
Kang et al, "Adding aggressive error correction to a high performance compressing flash file system", ACM EMSOFT, pp. 305-313, 2009.*
Goodson et al,"An analysis of data corruption in the storage stack", ACM Trans. on Storage, vol. 4, No. 3, pp. 1-28, 2008.*
Kim et al, "Remote progressive firmware update for flash based networked embedded systems", ACM ISLPED, pp. 407-412, 2009.*

\* cited by examiner

*Primary Examiner*—Anil Khatri
(74) *Attorney, Agent, or Firm*—Baker Botts L.L.P.

(57) ABSTRACT

Firmware for a baseboard management controller (BMC) of a blade server module in an information handling system may have automatic firmware corruption recovery and updating through a TFTP transfer from a central storage location having the most recent BMC firmware image. Upon blade power-on or reset the BMC firmware image is checked for corruption and if corrupted a new BMC firmware image is loaded into the BMC memory. If the BMC firmware image is not corrupted then it is checked to determine if it is the latest version. If it is the latest version the BMC starts normal program execution. If not the latest version then the BMC firmware is updated through the TFTP transfer from the central storage location having the most recent BMC firmware image.

20 Claims, 5 Drawing Sheets

AUTOMATIC FIRMWARE CORRUPTION RECOVERY AND UPDATE

TECHNICAL FIELD

The present disclosure relates generally to information handling systems and, more particularly, to information handling systems having automatic firmware corruption recovery and update.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

As consumer demand increases for smaller and denser information handling systems, manufacturers strive to integrate more computer components into a smaller space. This integration has led to the development of several applications, including high density servers. A high density server provides the computer processing resources of several computers in a small amount of space. A typical arrangement for a high density server includes a shared power supply system, a management module, a connection board (e.g., a back-plane or mid-plane) and server modules, such as blade server modules.

Blade server modules, or "blades," are miniaturized server modules that typically are powered from a common power supply system and are cooled by cooling system within a multi-server cabinet. Typically, a blade includes a circuit board with one or more processors, memory, a connection port, and possibly a disk drive for storage. By arranging a plurality of blades like books on a shelf in the multi-server cabinet, a high density multi-server system achieves significant cost and space savings over a plurality of conventional servers. These savings result directly from the sharing of common resources, e.g., power supplies, cooling systems, enclosures, etc., and the reduction of space required by this type of multi-server system while providing a significant increase in available computer processing power.

SUMMARY

Each blade has a baseboard management controller (BMC) that has firmware stored in non-volatile memory, e.g., electrically erasable and programmable read only memory (EEPROM), FLASH memory, etc. The BMC firmware non-volatile memory may be updated (updated firmware program written to the non-volatile memory) without the blade having to be removed from the blade server system. However there may be a problem if the updated firmware becomes corrupted due to an unexpected interruption while writing the firmware update to the non-volatile BMC firmware memory. Corruption of the BMC firmware memory may occur if the blade is removed from the blade system chassis, loss of blade system chassis power, loss of external network connectivity, hardware fault(s) within the blade server system such as a non-maskable interrupt (NMI) during the BMC firmware updating. If the BMC firmware gets corrupted for whatever reason, then the entire blade must be sent back to the manufacturer in order to recover the BMC firmware.

Therefore what is needed is an easy and cost effective way to recover a BMC firmware memory that has been corrupted without having to send the blade back to the manufacturer. Not having to send the blade back to the manufacture will improve the customer experience and also may reduce the requirements for keeping extra spare blades in case of corruption during a BMC firmware update. Also automatic updating and, if necessary, recovery from corruption of an attempted update would be very desirable.

Also not having to build blades having at least twice as much firmware memory required to support redundant firmware images will further reduce the cost and complexity of a blade.

The aforementioned problem of firmware corruption during updating also may apply to rack and tower server systems. Each server in a rack and tower server system may have a serial port or boot block based recovery path. However using a serial port or boot block recovery option still requires specific administrator setup and manual intervention. Automatic updating and recovery of firmware updates for servers of a rack and tower server system is also very desirable.

BRIEF DESCRIPTION OF THE DRAWINGS

A more complete understanding of the present disclosure thereof may be acquired by referring to the following description taken in conjunction with the accompanying drawings wherein.

Figure 1:
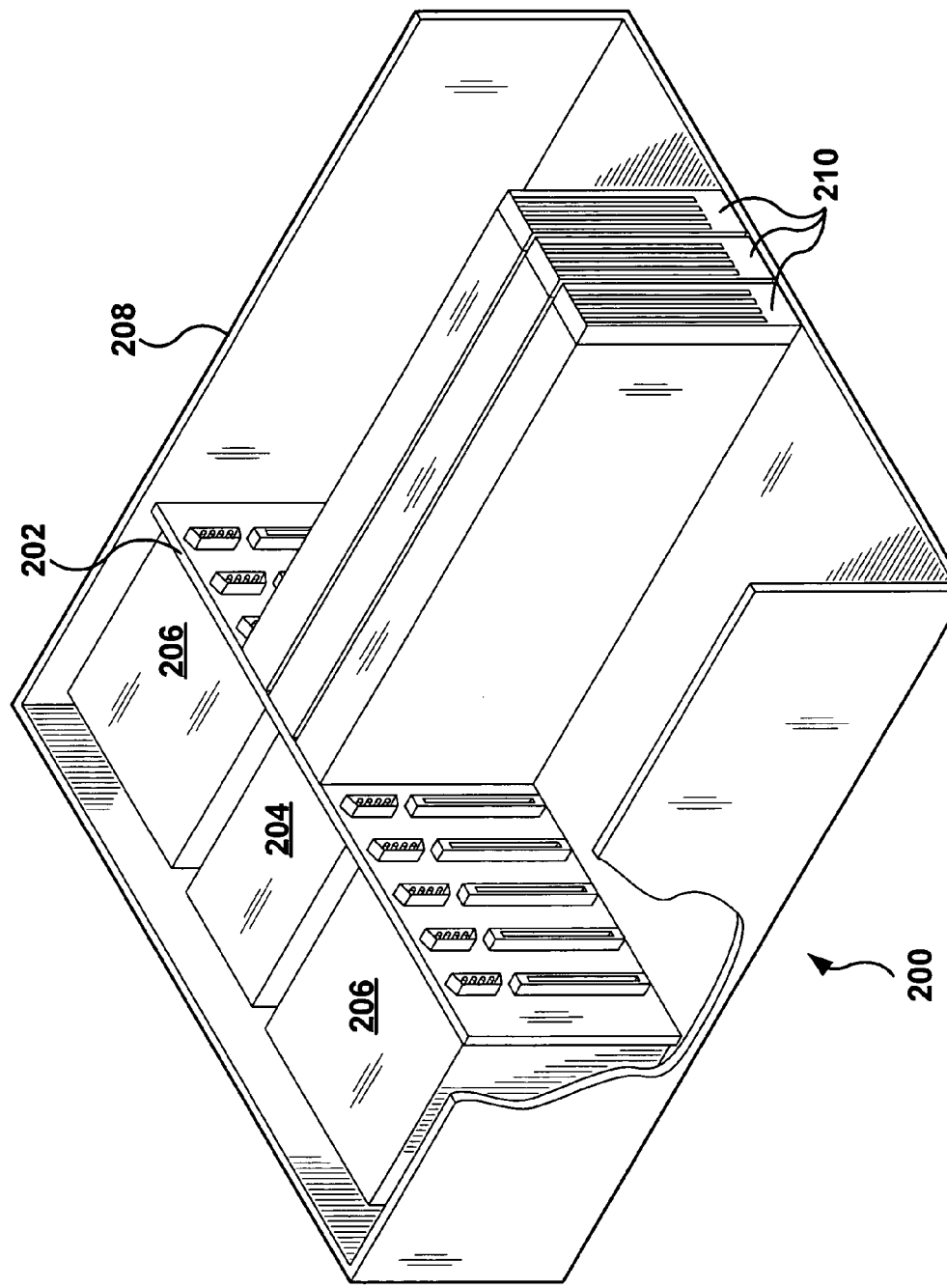
FIG. 1 is a schematic perspective view of a high density information handling blade server system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic perspective view of a high density information handling blade server system, according to a specific example embodiment of the present disclosure. The information handling server system, generally represented by the numeral 200, comprises at least one blade server module (BSM) 210, a power distribution board (PDB) 202, at least one power supply unit (PSU) 206 and a chassis management controller (CMC) 204. In certain embodiments, one example of an information handling server system 200 includes a high density server system 200 that may form a part of a component rack system (not expressly shown). Typically, the high density server system 200 may include an enclosure or chassis 208 in which the at least one PSU 206, CMC 204, PDB 202 and the at least one BSM 210 may be enclosed therein. Each BSM 210 may include a blade management controller (BMC) 212 (see FIG. 2).

Although FIG. 1 depicts a mid-plane PDB 202 as being placed between MMB 204 and the at least one BSM 210, the PDB 202 may be located anywhere in the information handling system 200, even external to the chassis 208. In alternate embodiments, the PDB 202 may be located along the back of the information handling server system 200 and may be referred to as a power distribution back-plane (not shown).

The high density server system 200 may be coupled to other computer components such as keyboards, video displays and pointing devices (not expressly shown). Typically, the information handling system 200 may include more than one PSU 206 such that a redundant power source may be provided. The PSU 206 may supply an output, e.g., an electrical voltage(s) for the at least one BSM 210. Generally, the PSU 206 output is coupled through the PDB 202 for distribution to the at least one BSM 210.

Figure 2:
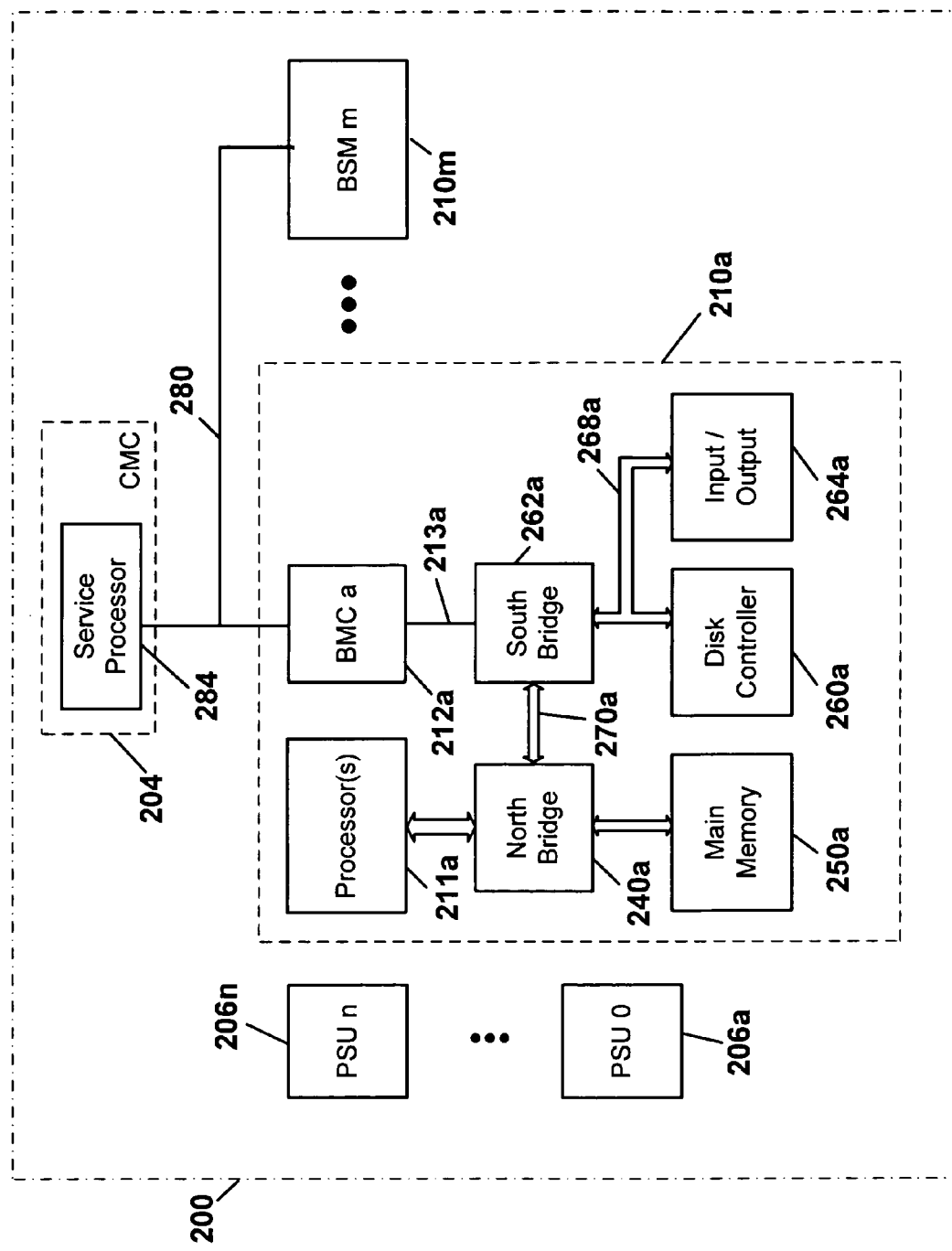
FIG. 2 is a schematic block diagram of an information handling blade server system having electronic components mounted on at least one printed circuit board (PCB) (motherboard not shown) and communicating data and control signals therebetween over signal buses.

Referring to FIG. 2, depicted is an information handling blade server system having electronic components mounted on at least one printed circuit board (PCB) (motherboard not shown) and communicating data and control signals therebetween over signal buses. In one example embodiment, the information handling server system is a computer blade server system. The information handling server system, generally referenced by the numeral 200, may comprise one or more blade server modules (BSMs) 210a-210m. For each of the blade server modules (BSMs) 210a-210m (for illustrative purposes only components for BSM 210a are shown) there may be a processor(s) 211a, a north bridge 240a, which may also be referred to as a memory controller hub or a memory controller that is coupled to a main system memory 250a, and the blade management controller (BMC) 212a. The north bridge 240a is coupled to the processor(s) 210a via the host bus 220a. The north bridge 240a is generally considered an application specific chip set that provides connectivity to various buses, and integrates other system functions such as a memory interface. For example, an Intel 820E and/or 815E chip set, available from the Intel Corporation of Santa Clara, California, provides at least a portion of the north bridge 240a. The chip set may also be packaged as an application specific integrated circuit (ASIC). The north bridge 240a typically includes functionality to couple the main system memory 250a to other devices within the information handling system 200. Thus, memory controller functions such as main memory control functions typically reside in the north bridge 240a. In addition, the north bridge 240a provides bus control to handle transfers between the host bus 220a and a second bus(es), e.g., PCI bus 270a. A third bus(es) 268a may also comprise other industry standard buses or proprietary buses, e.g., ISA, SCSI, I²C, SPI, USB, LPC buses through a south bridge(s) (bus interface) 262a. The BMC 212a may be coupled to the blade 210a with a low pin count (LPC) bus 213a through the south bridge 262a. Each BMC 212 of the blades 210 may be coupled to a service processor 284 in the CMC 204 over, for example but not limited to, a standard Ethernet link 280. The CMC 204 may control various blade system chassis functions and may be used to communicate (e.g., broadcast firmware updates) to each BMC 212 of the blades 210 in the blade server system 200.

Figure 3:
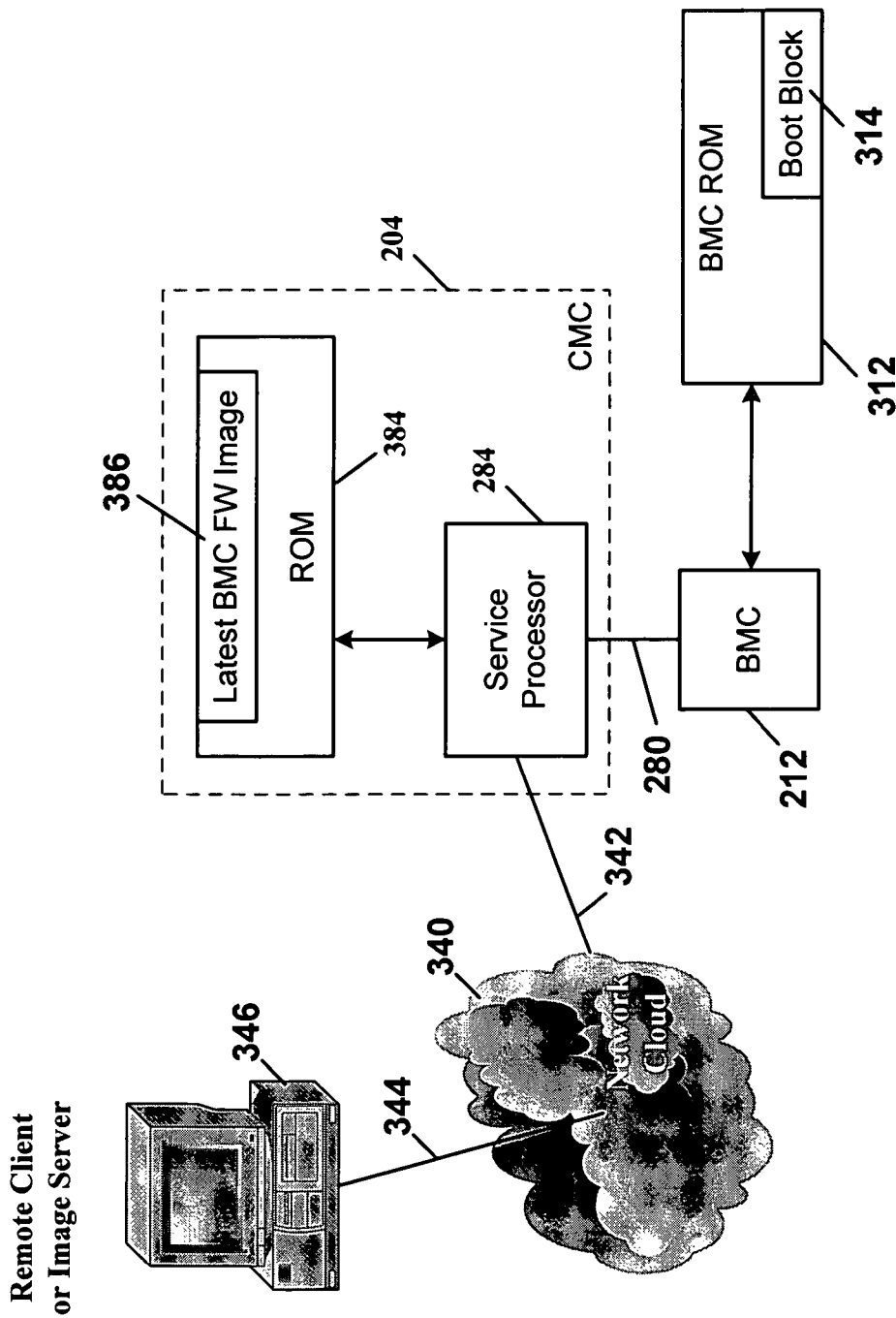
FIG. 3 is a schematic block diagram of a more detailed portion of the information handling blade server system shown in FIG. 2.

Referring now to FIG. 3, depicted is a schematic block diagram of a more detailed portion of the information handling blade server system shown in FIG. 2. The service processor 284 of the CMC 204 may be coupled to a management network 340 over a serial data bus, e.g., Ethernet connection 342. A remote client and/or image server 346a and 346b, respectively, may also be coupled to the management network 340 over serial data bus, e.g., Ethernet connection 344. The service processor 284 may thus communicate with the remote client 346a via the Internet, Extranet, Intranet, etc., and/or the image server 346b via an Ethernet hub or switch (not shown), or any other network topology, e.g., wireless, WIFI, WIMAX, etc.

Each BMC 212 may have a BMC read only memory (ROM) 312. And a boot block 314 that may reside in a portion of the BMC ROM 312. The CMC 314 may have a ROM 384 that may be coupled to the service processor 384. The latest BMC firmware image may be stored in the ROM 384 so that each of the BMC ROMs 312 may be updated as described in more detail herein.

Figure 4:
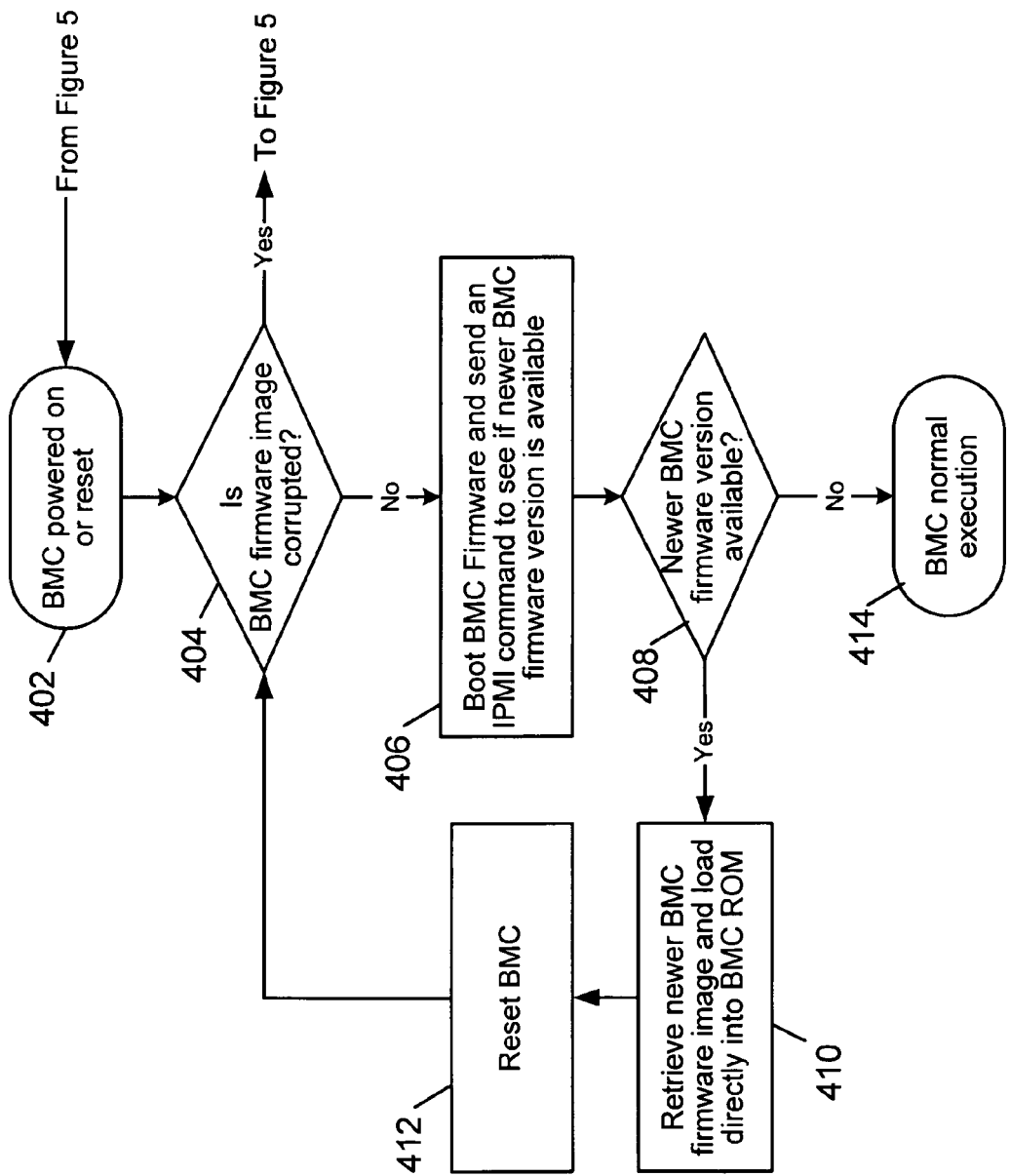
FIGS. 4 and 5 are schematic flow diagrams of sequences of steps for checking if a BMC firmware file is corrupted and whether the newest available BMC firmware version has been installed in a blade server, according to a specific example embodiment of the present disclosure.
Figure 5:
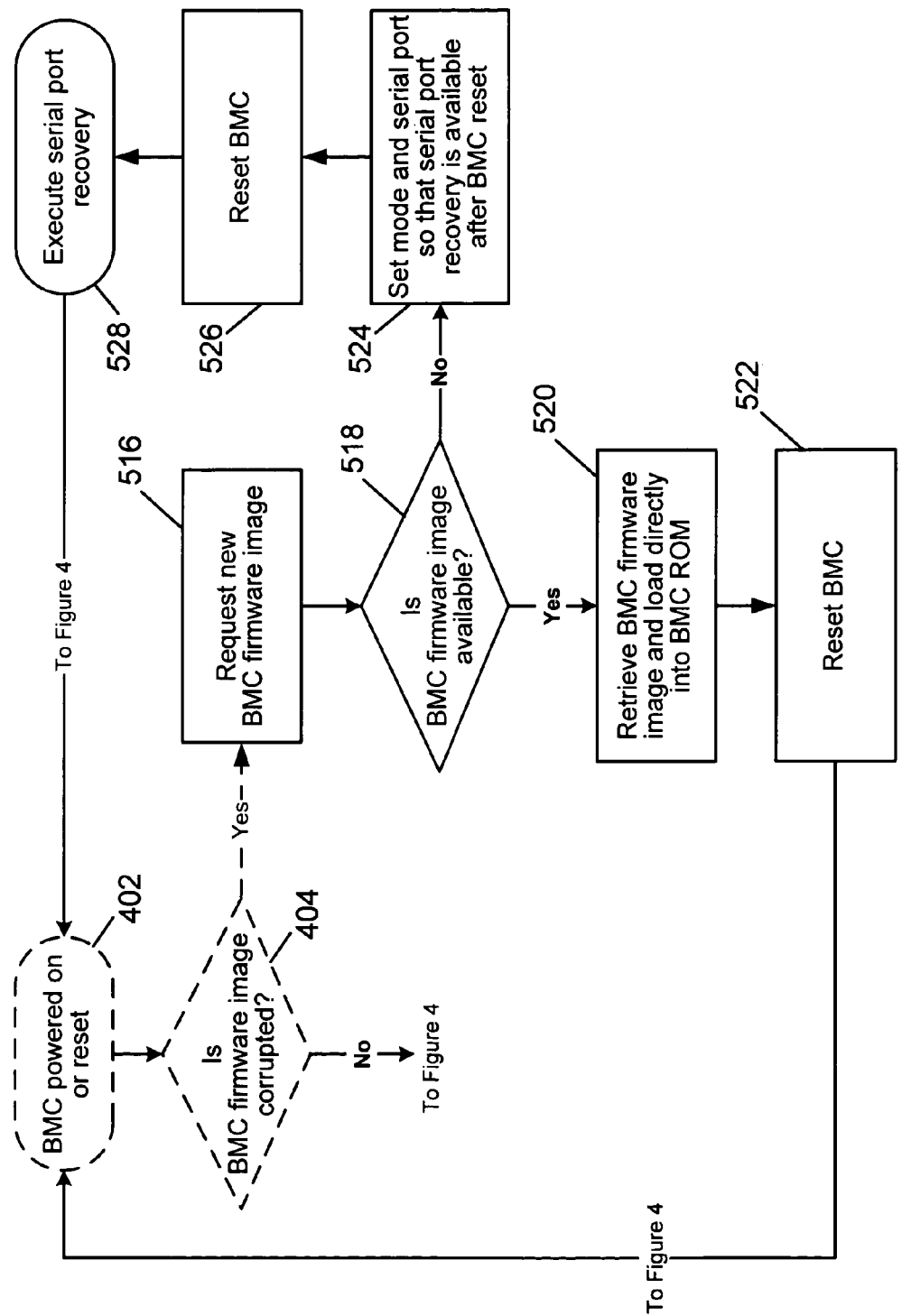

Referring now to FIGS. 4 and 5, depicted are schematic flow diagrams of sequences of steps for checking if a BMC firmware file is corrupted and whether the newest available BMC firmware version has been installed in a blade server, according to a specific example embodiment of the present disclosure. In Step 402 of FIG. 4, the BMC 212 is powered on or if already powered on, is reset. In step 404 the BMC firmware image residing in the BMC ROM 312 is checked for corruption and if there is no corruption of this firmware then in step 406, the BMC is booted from the firmware in the ROM 312 and an IPMI command may be sent to see if a newer BMC firmware version is available. Step 408 determines whether there is a newer version of the BMC firmware then what is in the BMC ROM 312. If there is not a newer version of the BMC firmware, then in step 414 the BMC begins normal program execution.

However, if there is a newer version of the BMC firmware, then in step 410 the newer BMC firmware image is retrieved and may be loaded directly into the BMC ROM 312. For example, the BMC firmware may execute a Trivial File Transfer Protocol (TFTP) command to retrieve the newer BMC firmware and may then write it directly to the non-volatile ROM 312, e.g., FLASH memory. After the new BMC firmware is installed in the ROM 312, the BMC 212 may be reset in step 412.

If in step 404 the BMC firmware image is determined to be corrupted then in step 516 (FIG. 5) a new BMC firmware image is requested. For example, the BMC boot block 314 may look for a recovery image via TFTP from 1 of 2 fixed IP addresses (e.g., CMC1 or CMC2) and a fixed file name. For example, the command may be "tftp -i 192.168.1.120 get firmware.bin" for retrieving a replacement BMC firmware image. After the BMC firmware image has been requested in step 516, step 518 then determines whether the BMC firmware image is available. If the BMC firmware image is determined to available in step 518, then in step 520 the BMC firmware image is retrieved and may be loaded directly into the BMC ROM 312. Once this BMC firmware image has been loaded into the BMC ROM 312, the BMC 212 may be reset in step 522.

In step 518, if the BMC firmware image is determined not to be available then in step 524 a mode and serial port are set so that the serial port may be used to recover the BMC firmware after the BMC 212 has been reset in step 526. In step 528 a serial port BMC firmware recovery may be performed. After a successful serial port BMC firmware recovery the BMC 212 may be reset in step 402 and the new BMC firmware may execute in the BMC 212 as disclosed herein.

The aforementioned steps for BMC firmware verification, updating and corruption recovery may be performed automatically upon an occurrence of a BMC power-on and/or reset. All BMCs 212 of a blade server system 200 may obtain the newest version BMC firmware image from a single central location, thus insuring consistent and reliable BMC firmware updating with minimal administrative overhead and/or intervention.

Rack and tower server systems (not shown) may have similar functional subsystems as the aforementioned blade server system 200. Each server in a rack and tower server system may have a serial port or boot block based recovery path. However, using a serial port or boot block recovery option still requires specific administrator setup and manual intervention. Automatic updating and recovery of firmware updates for servers of a rack and tower server system may be accomplished according to teachings of this disclosure.

The aforementioned steps may also be applied for rack and tower server firmware verification, updating and corruption recovery. These steps may be performed automatically upon an occurrence of a server power-on and/or reset. All servers of a server system may obtain the newest version firmware image from a single central location, thus insuring consistent and reliable firmware updating with minimal administrative overhead and/or intervention.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for automatic firmware corruption recovery and update of an information handling system, wherein the information handling system comprises a memory and at least one or more processors, said method comprising the steps of:
   checking a firmware image for corruption whenever a power-on or reset occurs;
   requesting a replacement firmware image only from a central location connected to each of a plurality of networked computers for the corrupted firmware image, if the firmware image is corrupted;
   booting from the firmware image then checking only at the central location if a newer version of the firmware image is available, if the firmware image is not corrupted, wherein
   if the newer version of the firmware image is available at the central location then:
      executing at the at least one or more processors a file transfer protocol command to retrieve the newer version of the firmware image from the central location,
      loading the newer version of the firmware image directly to a memory location of the firmware image, and
      booting the newer version of the firmware image, and
   if the newer version of the firmware image is not available at the central location then beginning normal program execution until another power-on or reset occurs;
   determining only at the central location whether the replacement firmware image is available, if the firmware image is corrupted, wherein
   if the replacement firmware image is available at the central location then retrieving and loading the replacement firmware image directly to the memory location of the firmware image from the central location,
   if the replacement firmware image is not available at the central location then setting a mode and serial port so that a serial port recovery is available then resetting, and
   executing the serial port recovery.

2. The method according to claim 1, wherein the firmware image is stored in a non-volatile read only memory.

3. The method according to claim 1, wherein the firmware image is used with a baseboard management controller (BMC) of a blade server in a blade server system.

4. The method according to claim 3, wherein the step of loading the newer version of the firmware image into the BMC further comprises the step of loading from a chassis management controller (CMC).

5. The method according to claim 3, wherein the step of loading the replacement of the firmware image into the BMC further comprises the step of loading from a chassis management controller (CMC).

6. The method according to claim 1, wherein the firmware image is used with a baseboard management controller (BMC) of a rack server in a rack server system.

7. The method according to claim 6, wherein the step of loading the newer version of the firmware image into the BMC further comprises the step of loading from a remote assistant card (RAC).

8. The method according to claim 6, wherein the step of loading the replacement of the firmware image into the BMC further comprises the step of loading from a remote assistant card (RAC).

9. The method according to claim 1, wherein the firmware image is used with a management controller of a tower server.

10. The method according to claim 1, wherein the file transfer protocol command executed to retrieve the newer version of the firmware image from the central location is a trivial file transfer protocol (TFTP) command.

11. The method according to claim 1, wherein the step of retrieving the replacement of the firmware image includes the step of executing a trivial file transfer protocol (TFTP) command.

12. A computer program, stored in a tangible medium, for automatic firmware corruption recovery and update comprising executable instructions that cause at least one processor to:
check a firmware image for corruption whenever a power-on or reset occurs;
request a replacement firmware image only from a central location connected to each of a plurality of networked computers for the corrupted firmware image, if the firmware image is corrupted;
boot from the firmware image then checking only at the central location if a newer version of the firmware image is available, if the firmware image is not corrupted, wherein
if the newer version of the firmware image is available at the central location then:
execute a file transfer protocol command to retrieve the newer version of the firmware image from the central location,
load the newer version of the firmware image directly to a memory location of the firmware image, and
boot the newer version of the firmware image, and
if the newer version of the firmware image is not available at the central location then begin normal program execution until another power-on or reset occurs;
determine only at the central location whether the replacement firmware image is available, if the firmware image is corrupted, wherein
if the replacement firmware image is available at the central location then retrieve and load the replacement firmware image directly to the memory location of the firmware image from the central location, if the replacement firmware image is not available at the central location then set a mode and serial port so that a serial port recovery is available then reset, and execute the serial port recovery.

13. The computer program of claim 12, wherein the firmware image is stored in a non-volatile read only memory.

14. The computer program of claim 12, wherein the firmware image is used with a baseboard management controller (BMC) of a blade server in a blade server system.

15. The computer program of claim 12, wherein the firmware image is used with a baseboard management controller (BMC) of a rack server in a rack server system.

16. The computer program of claim 12, wherein the file transfer protocol command executed to retrieve the newer version of the firmware image from the central location is a trivial file transfer protocol (TFTP).

17. The computer program of claim 12, further comprising executable instructions that, when executed, cause the at least one of the one or more processors to execute a trivial file transfer protocol (TFTP) command at the retrieve the replacement of the firmware image step.

18. A computer program, stored in a tangible medium, for automatic firmware corruption recovery comprising executable instructions that cause at least one processor to:
check a firmware image for corruption whenever a power-on or reset occurs to determine whether the firmware image is corrupted;
request a replacement firmware image only from a central location connected to each of a plurality of networked computers for the corrupted firmware image, if the firmware image is corrupted;
determine only at the central location whether the replacement firmware image is available, if the firmware image is corrupted;
retrieve and load the replacement firmware image directly to a memory location of the firmware image from the central location, if the replacement firmware image is available at the central location;
set a mode and serial port so that a serial port recovery is available then reset and execute the serial port recovery, if the replacement firmware image is not available at the central location.

19. The computer program of claim 18, wherein the firmware image is used with a baseboard management controller (BMC) of a blade server in a blade server system.

20. The computer program of claim 19, further comprising executable instructions that, when executed, cause the at least one of the one or more processors to load the replacement firmware image from a chassis management controller (CMC).

* * * * *